(12) United States Patent
Pan et al.

(10) Patent No.: US 7,058,257 B2
(45) Date of Patent: Jun. 6, 2006

(54) MINIATURE WDM ADD/DROP MULTIPLEXER AND METHOD OF MANUFACTURE THEREOF

(75) Inventors: Jing-Jong Pan, Milpitas, CA (US); Yousheng (Eugene) Wu, San Jose, CA (US)

(73) Assignee: Lightwaves 2020, Inc., Milpitas, CA (US)

( * ) Notice: Subject to any disclaimer, the term of this patent is extended or adjusted under 35 U.S.C. 154(b) by 87 days.

(21) Appl. No.: 10/812,497

(22) Filed: Mar. 30, 2004

(65) Prior Publication Data
US 2005/0141815 A1  Jun. 30, 2005

Related U.S. Application Data

(60) Provisional application No. 60/533,456, filed on Dec. 30, 2003.

(51) Int. Cl.
*G02B 6/28* (2006.01)
*H04J 14/02* (2006.01)

(52) U.S. Cl. ............... 385/24; 385/88; 385/89; 385/92; 398/79; 398/82; 398/85

(58) Field of Classification Search ............... 385/24, 385/37, 88, 89, 92; 398/79, 80, 81, 82, 83, 398/95, 85, 86, 87
See application file for complete search history.

(56) References Cited

U.S. PATENT DOCUMENTS

| | | | | |
|---|---|---|---|---|
| 4,244,045 | A | * | 1/1981 | Nosu et al. ............... 398/86 |
| 6,198,864 | B1 | * | 3/2001 | Lemoff et al. ............ 385/47 |
| 6,212,312 | B1 | * | 4/2001 | Grann et al. ............. 385/24 |
| 6,748,133 | B1 | * | 6/2004 | Liu et al. ................ 385/24 |
| 6,832,018 | B1 | * | 12/2004 | Abushagur ............... 385/24 |

* cited by examiner

*Primary Examiner*—Brian M. Healy
(74) *Attorney, Agent, or Firm*—Aka Chan LLP

(57) ABSTRACT

A miniature WDM add/drop multiplexer and its manufacture is described. The device has a plurality of wavelength-dependent filters in the form of thin-film filters mounted to a core frame with the end sections of the input/output optical fiber and other optical fibers associated with each of the filters. The stresses associated with the filters are accounted for. The core frame is sealed, together with the overall package assembly, to provide for long-term reliability of the device. The described device and method of manufacture is also generally applicable to WDM multiplexers and demultiplexers.

32 Claims, 8 Drawing Sheets

MINIATURE WDM ADD/DROP MULTIPLEXER AND METHOD OF MANUFACTURE THEREOF

RELATED APPLICATION

This application claims priority to Provisional Application No. 60/533,456, filed Dec. 30, 2003, which is incorporated herein by reference in its entirety.

BACKGROUND OF THE INVENTION

The present invention is related to optical devices for fiberoptic systems and networks and, in particular, to WDM multiplexer/demultiplexers, i.e., WDM multiplexers, demultiplexers and add/drop multiplexers.

In WDM (Wavelength Division Multiplexing) fiberoptic systems and networks, the wavelength of optical signals is used to define a communication channel through the system. While the term, WDM, also refers to a specific ITU (International Telecommunications Union) standard, WDM is used herein in the former, more general, sense unless the stricter definition is specifically identified. A WDM multiplexer combines a plurality, typically all, of the channels into a single optical path and a WDM demultiplexer splits or separates a plurality, typically all, of the constituent channels in an optical path. A WDM add/drop multiplexer is a component in WDM networks with the functions of WDM multiplexing and/or demultiplexing; it allows optical signals of one or more particular wavelengths to be inserted, i.e., added, into an optical fiber and/or optical signals of one or more wavelengths to be diverted, i.e., dropped, from the optical fiber. The added and dropped signals can be assigned to one or more users with the added signals being transmitted by the user(s) to the optical network and the dropped signals being received by the user(s) from the network.

One example of a WDM add/drop multiplexer is an assembly of cascaded WDM couplers such as shown in FIG. 22 of U.S. Pat. No. 5,642,448, entitled "INTEGRABLE FIBEROPTIC COUPLER AND RESULTING DEVICES AND SYSTEMS," and which issued Jun. 24, 1997 to J. J. Pan et al. In the drawing, each of the couplers "drops" optical signals of one of the wavelengths $\lambda_1$–$\lambda_7$, while signals at the wavelength $\lambda_8$ are separated as the remainder after the other wavelengths have been removed. With a reversal in direction of all the light signals, the assembly can perform an "add" function for the optical signals at each of the wavelengths $\lambda_1$–$\lambda_8$. Nevertheless, this assembly manifests the problems of current WDM add/drop multiplexers; manufacturing costs are higher than desirable and the packaged device is bulky.

The present invention addresses these problems of a WDM add/drop multiplexer in particular, and, more generally, provides for WDM multiplexer/demultiplexers, i.e., WDM multiplexer, demultiplexer or WDM add/drop multiplexer devices, which are less costly to manufacture and which is miniature in size. Optical performance is good, especially for emerging CWDM (Coarse Wavelength Division Multiplexing) networks which are being used in Metropolitan Area Networks (MANs). In CWDM networks, the wavelength channels are spaced further apart than the ITU-defined Dense WDM, or DWDM, channel spacings to avoid or reduce many of the problems of tight channel spacing.

SUMMARY OF THE INVENTION

The present invention provides for a WDM multiplexer/demultiplexer which has an input/output optical fiber having an end section, a first set of optical fibers having end sections, a second set of optical fibers having end sections, a plurality of wavelength-dependent filters, each wavelength-dependent filter associated and in fixed relationship with an end section of the first and second set optical fibers so that light transmitted through the wavelength-dependent filter passes into the associated end section and optical fiber. The WDM multiplexer/demultiplexer also includes a core frame which holds the end sections of the input/output optical fiber, the end sections of the first and second set optical fibers, and the plurality of wavelength-dependent filters so that light from the input/output optical fiber and reflected by the plurality of wavelength-dependent filters travels in a light path from the input/output optical fiber to each wavelength-dependent filter of each end section of the first and second set optical fibers alternately. The core frame has a central space. The end sections of the first set optical fibers are aligned in parallel with each other, the end sections of the second set optical fibers aligned in parallel with each other, and the end sections of the first set optical fibers and wavelength-dependent filters associated therewith face the end sections of the second set optical fibers and wavelength-dependent filters associated therewith at an angle across the central space on opposite sides of the core frame.

The present invention also provides for a WDM multiplexer/demultiplexer wherein each of the wavelength-dependent filters has a first side and a second side, and wavelength-dependent filters are mounted to a core frame by the first side and said second side alternately in the light path to minimize divergence degradation. Furthermore, each wavelength dependent filter comprises a die which is mounted to the core frame so as to allow the die to flex with changes of temperature.

The present invention also provides for a WDM multiplexer/demultiplexer which has a core assembly which seals the core frame, end sections of input/output optical fiber and of first and second set optical fibers and wavelength-dependent filters, and which has a package assembly which holds the core assembly for double seal against moisture.

BRIEF DESCRIPTION OF THE DRAWINGS

FIG. 2C is a detailed view of one end of the core frame; FIG. 2D is a detailed view of the opposite end of the core frame.

DESCRIPTION OF SPECIFIC EMBODIMENTS

Organization of Device

Figure 1:
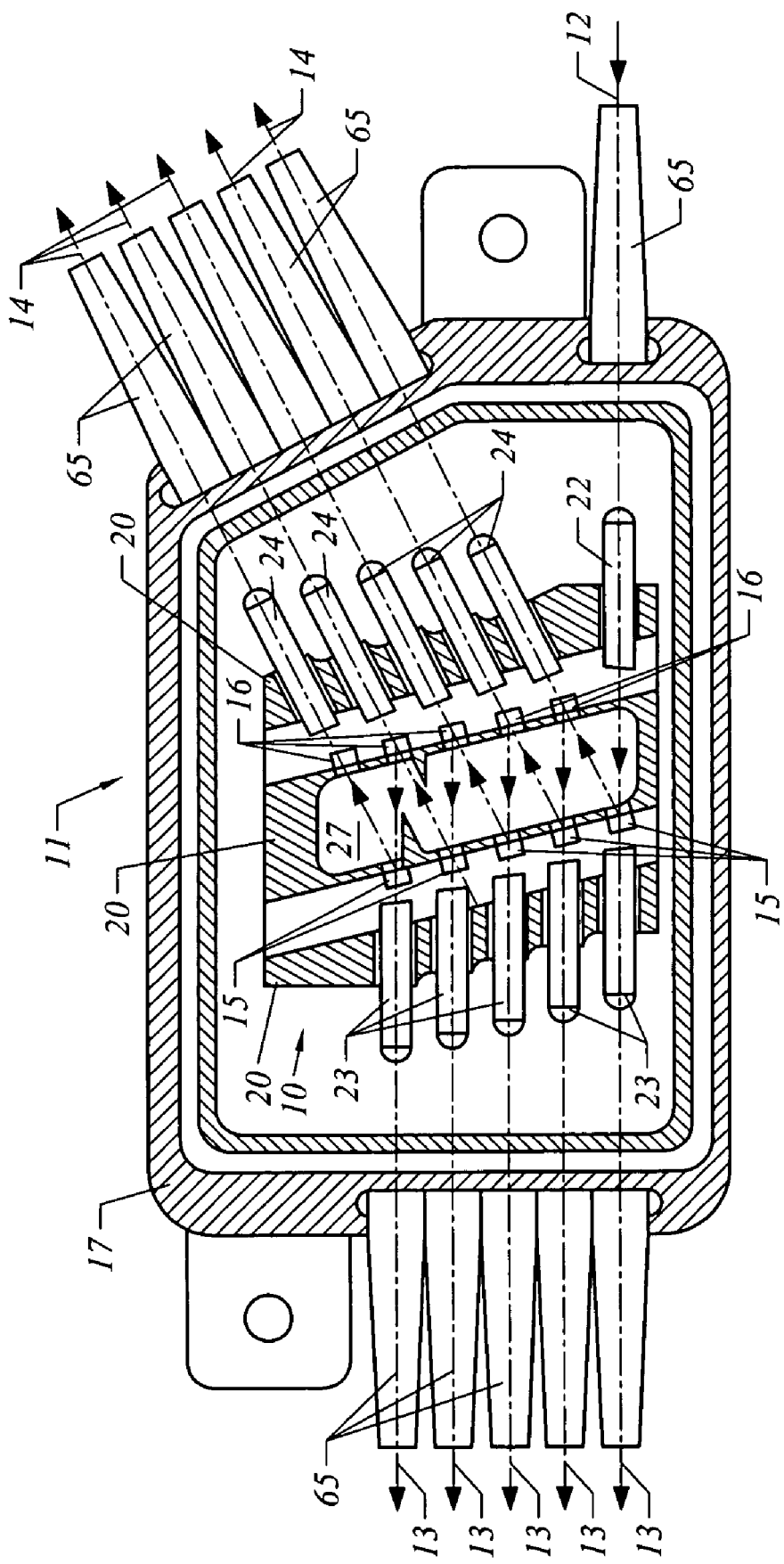
FIG. 1 is a cross-sectional top view of a 1×10 WDM add/drop multiplexer, according to one embodiment of the present invention.

An embodiment of the present invention is illustrated in FIG. 1 which shows a 1-10 WDM add/drop multiplexer in a top cross sectional view. A package assembly 11 holds a core assembly 10 for an input/output optical fiber 12 and first and second sets of five optical fibers 13 and 14 respectively. The core assembly 10 has a core frame 20 which mounts end sections 22–24 of the input/output fiber 12 and first and second sets of the optical fibers 13 and 14 respectively. The core frame 20 also mounts wavelength-dependent filters 15 and 16 for the first set optical fibers 13 and second set optical fibers 14 respectively. The core assembly 10 is, in turn, protected by the package assembly 11 which has a package housing base 17 and a package housing top 66 (not shown in FIG. 1). The core assembly 10 is mounted in an interior cavity of the package housing base 17 and top 66 which provide exterior access to the optical fibers 12–14. Silicone rubber or plastic boots 65 provide exterior protection for the optical fibers 12–14 as they leave the package assembly 11.

Figure 2A:
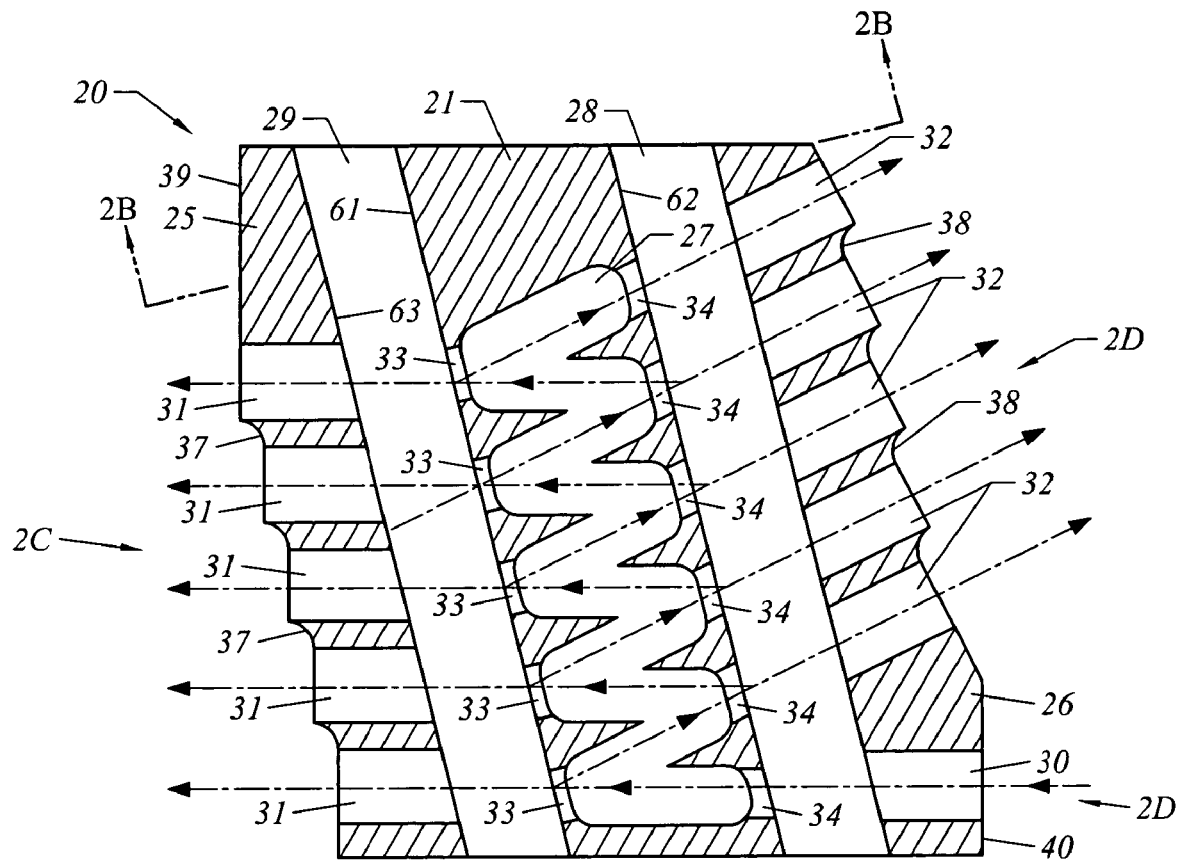
FIG. 2A is a detailed cross-sectional top view of the core frame of the FIG. 1 WDM add/drop multiplexer.
Figure 2B:
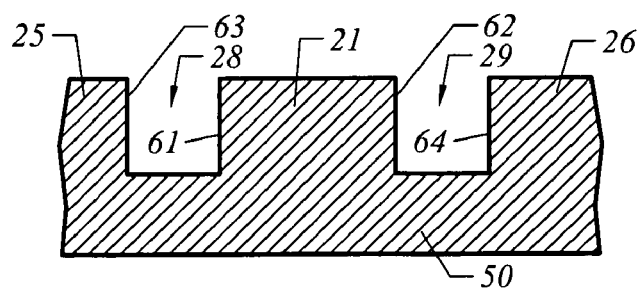
FIG. 2B is a cross-sectional view of a portion of the FIG. 2A core frame.

A top view of the core frame 20 is illustrated in FIG. 2A. The core frame 20 is formed from a unitary metal block. Two parallel channels 28 and 29 in the core frame 20 define side lands 25 and 26 and a center land 21 with side surfaces 61 and 62 over a core frame base 50, as illustrated in the cross-sectional view of FIG. 2B. A central space 27 defined in the center land 21 permits the light transmission in a zigzag pattern from the input/output fiber 12 reflected between the wavelength-dependent filters 15 and 16 which are mounted on the highly parallel side surfaces 61 and 62. Through the side land 25 are cylindrical apertures 31 which receive the end sections 23 of the first set optical fibers 13. Similarly, the side land 26 has cylindrical apertures 30 and 32; the cylindrical aperture 30 receives the end section 22 of the input/output fiber 12, and the cylindrical apertures 32 receive the end sections 24 of the second set optical fibers 14. The longitudinal axes of the cylindrical apertures 31 are aligned parallel to each other and to the longitudinal axis of the cylindrical aperture 30, and the longitudinal axes of the cylindrical apertures 32 are aligned parallel to each other and at an angle $2\alpha$ with respect to the axes of the apertures 30,31.

To facilitate the alignment of these apertures 30–32, the outside edge surfaces of the lands 25 and 26 are perpendicular to the longitudinal axis of each respective aperture. The edge surfaces 37 and 38 of the edge lands 25 and 26 are scalloped and a flat edge surface 40 of the edge land 26 is similarly perpendicular to the aperture 30 for the input/output fiber 12. (The corresponding flat edge surface 39 in the edge land 25 has no aperture.) FIG. 2C is a side view of the core frame 20 and the openings for the apertures 31 in the edge surfaces 37 of the edge land 25; and FIG. 2D is a side view of the opposite edge of the core assembly 20 with the circular openings for the apertures 30 and 32 in edge surfaces 40 and 38 in the edge land 26.

Figure 3:
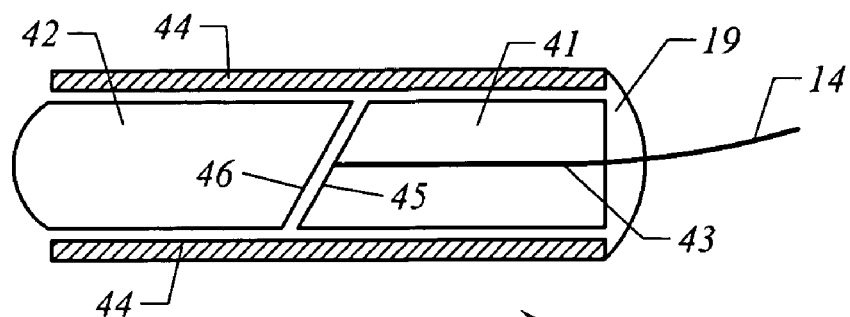
FIG. 3 is a cross-sectional view of an end section of an optical fiber in the FIG. 1 WDM add/drop multiplexer.

The end sections 22–24 of the optical fibers 12–14 fit in the corresponding apertures 30–32. FIG. 3 is a cross sectional view of a representative end section of fiber 14, in this case. A metal sleeve 44, with dimension to carefully fit into one of the cylindrical apertures 32, holds a glass cylinder 41 and a collimating C-lens 42. The C-lens is preferable over a GRIN lens, which can be used in place of the C-lens, because of lower costs. In a central aperture 43 of the glass cylinder 41 the core and cladding of the optical fiber 14 are fixed by epoxy. The open end surface 45 of the cylinder 41 and the optical fiber 14 are polished at an angle of 6–8° from the perpendicular to the longitudinal axis of the aperture 43 and the rear end surface 46 of the collimating C-lens 42 is also angled in complementary relationship with the surface 45. Epoxy 19 further fixes the cylinder 41 and fiber 14 to the sleeve 44. Epoxy similarly fixes the C-lens 42 in the sleeve 44. Collimated light received by the C-lens 42 is focused at the end of the optical fiber 14 in the cylinder end surface 45. Conversely, light leaving the C-lens 42 from the optical fiber 14 is collimated.

The end sections for the optical fibers 12 and 13 are similarly constructed.

Core Assembly Details

As shown in FIGS. 1 and 2A, the central space 27 of the center land 21 is shaped to allow light from the input/output fiber 12 to reach the first and second sets of optical fibers 13 and 14. Cylindrical apertures 33, 34 and 36 in the side walls of the center land 21 connect the central space 27 to the channels 28 and 29 so that light can pass between the optical fibers 12–14 having their respective end sections held in the side lands 25 and 26 and the central space 27. The aperture 36 is associated with the input/output optical fiber 12 and is located across the channel 28 from the aperture 30. The apertures 33 are associated with the first set of optical fibers 13 and are located across the channel 29 from the apertures 31. The apertures 34 are associated with the second set of optical fibers 14 and are located across the channel 28 from the apertures 32.

The wavelength-dependent filters 15 and 16 in the form of thin-film filter dice are mounted over the apertures 33 and the apertures 34, as shown in FIG. 1. With the slant of core frame 20, light upon the dice 15 and 16 are incident at the angle $\alpha$, in the range of 8–15° from the normal. See FIG. 2E. Light from the input/output fiber 12 which is not transmitted through the first thin-film filter 15 is reflected toward the first thin-film filter die 16. If the light is not transmitted by the first thin-film filter die 16, then the light is reflected toward the second thin-film filter die 15. If the light is not transmitted by the second thin-film filter die 15, then the light is reflected toward the second thin-film filter die 16, and so on in an upward zigzag fashion between the filters 15 and 16. Light which is transmitted through a filter 15 and 16 is received by the filter's corresponding optical fiber 13 and 14.

The filters 15 and 16 can be low-pass, high-pass and band-pass filters appropriately selected and located on the core frame 20 for WDM add/drop operations. In this embodiment of the present invention, the center wavelengths of the thin film filters are spaced 20 nm apart. Specifically, the center wavelengths of the thin film filters at an angle of incidence of 13.4° are 1470 nm, 1490 nm, 1510 nm, 1530 nm, 1550 nm, 1570 nm, 1590 nm, and 1610 nm for CWDM modules at the 1550 nm band. For CWDM modules at the 1310 nm band, the center wavelengths are 1270 nm, 1290nm, 1310 nm, 1330 nm, 1350 nm, 1370 nm, 1390 nm, 1410 nm and 1430 nm in accordance with ITU standards. Other channels are possible with little modifications. For example, devices to handle channels with 400 GHz and 200 GHz spacings can be made with small angle glass wedges to adjust the angle of incidence of the light to each filter die 15 and 16. With more small modifications, even DWDM channels with 100 GHz spacing are possible.

The thin-film filter dice are formed from substrates over which many, typically well over 100, dielectric coatings are deposited to obtain the desired filtering function. U.S. Pat. No. 6,039,806, which issued Mar. 21, 2000 and entitled, "Precision Thickness Optical Coating System and Method of Manufacture Thereof," describes one example of deposition equipment and manufacturing methods for creating such thin film filters. Since light impinges upon the filters 15 and 16 at the angle of incidence α, adjustments should be made for optimum filter operation. The central wavelength of a thin-film filter at normal incidence and at the angle of incidence α is related by the following equation:

$$\lambda = \lambda_0 \sqrt{1 - A \sin^2 \alpha}$$

where λ is central at angle of incidence α; $\lambda_0$ is the wavelength at normal incidence; A is a constant dependent upon the particular dielectric coating materials. For example, filters with $SiO_2$ and $Ta_2O_5$ as the low and high index of refraction materials respectively have A equal to approximately 0.371. Besides the central wavelength shift from normal incidence to oblique incidence, the spectrum shape, especially the ripple, of the filter transmission, also changes. However, optimized filter design and proper coating monitoring and control techniques can lessen this impairment. Generally speaking, a filter with a symmetric cavity, which refers to the filter's thin film stack structure, maintains its spectrum shape more easily as the incidence angle changes from normal to oblique. Alternately, the coating process of the filter might be monitored and controlled for the particular incident angle a, e.g., 13.4°, for the specific embodiment described above.

For optimum optical performance, the two optical surfaces of the filter dice 15 and 16 must be parallel to match the parallel planes of the dice mounting surfaces, i.e., the central land side surfaces 61 and 62. Prior to the deposition of dielectric layers, the optical surfaces of each filter dice are polished to obtain a high degree of parallelism between the two surfaces, less than 0.05° deviation. Additionally, anti-reflection coatings are deposited on the substrate side so that residual reflectivity is less than 0.1% reduce ripples in the filters' transmission bands.

With the filter dice 15 and 16 mounted, the end section 22 of the input/output fiber 12 is carefully aligned by a close fit with the aperture 30 in the edge land 26. Ultra-thin epoxy inside the spacing between the end section 22 and aperture 30 allows very little change in position of the end section 22 and its collimating C-lens 42. On the other hand, the apertures 31 and 32 allow more play for the end sections 23 and 24 respectively. With the filter dice 15 and 16, and the end section 22 fixed on the core frame 20, the end sections 23 and 24 are actively aligned within the apertures 31 and 32 to minimize the insertion losses, i.e., each end section 23 and 24 is sequentially adjusted within its respective aperture 31 and 32 until the maximum signal is received by the corresponding optical fiber 13 and 14 from the input optical fiber 12. At that point the end section is 31 and 32 is fixed by epoxy within the aperture 31 and 32.

In operation, light signals entering the WDM add/drop multiplexer through the optical fiber 12 are separated according to wavelength by the wavelength-dependent filters 15 and 16, and transmitted into the corresponding optical fibers 13 and 14. The end sections 23 and 24 of the first and second sets of optical fibers 13 and 14 respectively are positioned with the wavelength-dependent filters 15 and 16 as detailed below, and dotted arrows in FIGS. 1 and 2A illustrate the light paths through the WDM add/drop multiplexer. As described, the device performs a "drop" function. If the signal directions are reversed, i.e., light at the proper wavelengths enter the WDM add/drop multiplexer through optical fibers 13 and 14, the light is combined and leaves the device through the input/output fiber 12 for an "add" function.

To maintain the described elements of the WDM add/drop multiplexer in precise relationships with each other, the core frame 20 is formed from 440C stainless steel, which has the necessary properties of hardness, strength, and coefficient of thermal expansion. Other steps are taken to ensure that the device functions properly over changes in temperature. An example is the zigzag shape of the central space 27 which reflects the removal of only material in the way of the light path reflected between the filters 15 and 16. Conservative material removal maintains the integrity of the core frame 20 and prevent distortion from thermal and mechanical stresses. The materials for the elements and epoxies of the core assembly 10 are also selected for close coefficients of thermal expansion (CTE) to avoid thermal mismatch. For example, the CTE of the 440C stainless steel core frame 20 is close to that of the substrate of the thin-film dies 15 and 16, and the epoxy which fixes the metal sleeves 44 of the fiber end sections 22–24 (FIG. 3) in the core frame 20 is selected to have a CTE match as close as possible with the CTEs of the sleeves 44 and core frame 20 given the bonding requirements.

Figure 2E:
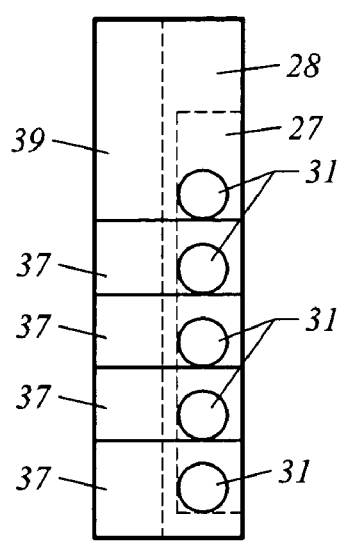
FIG. 2E shows the mounting of a wavelength-dependent filter to the core frame in detail.
Figure 2E:
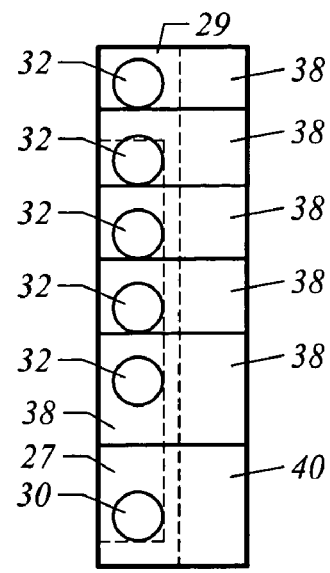
Figure 2E:
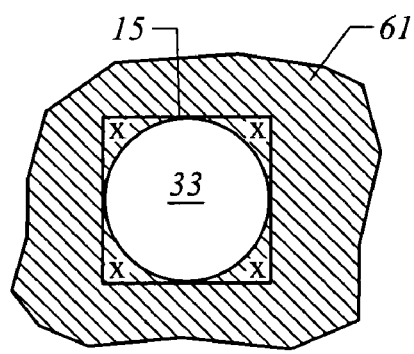

Furthermore, each of the thin film filters 15 and 16 is mounted over its corresponding aperture 33 and 34 as shown in FIG. 2E. In the representative drawing, the rectangular die which forms the thin film filter, 15 in this example, covers the aperture 33 and is fixed to the side surface 61 of the central land 21 by epoxy at the corners of the die and the end surface 61, as marked by "x's" in the drawing. The filter dice 15 and 16 are first held in place by a fixture and the epoxy cured by UV light. Subsequently the epoxy is thermally cured to securely bond the filter dice 15 and 16 to the core frame 20. The mounting of a die at only its four corners reduces stress, which is inherently created by the difference in die materials, the deposited multiple thin dielectric film layers and the die substrate itself. Such stresses cause minute flexing of the filter die which can adversely affect the performance of the WDM device if not accounted for.

Figure 2F:
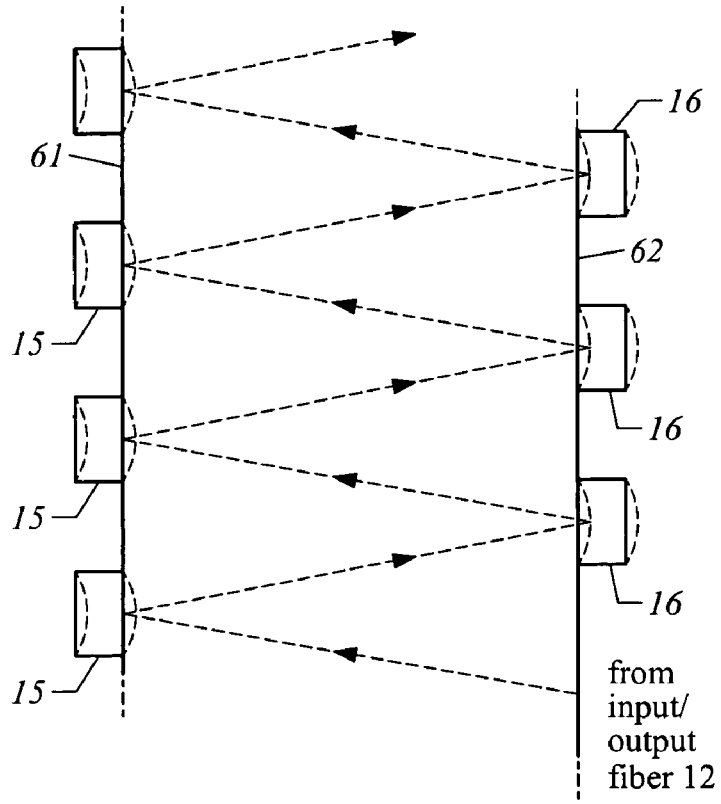
FIG. 2F is a representational drawing which illustrates the changes in flexing of the filters with changes in temperature.

To further alleviate the adverse effects of stress, including that introduced by changes in temperature, the filter dice 15 and 16 are alternately mounted with one filter die having one side, thin film deposition side, for example, fixed to the core frame 20 and the next filter die in the light path mounted with its substrate side to the core frame 20. Hence all the filter dice 15 are mounted to the core frame 20 in one way and all the filter dice 16 mounted in the other way. The filter dice 15 and 16, which are already flexed or bent from the intrinsic stress induced by the deposited dielectric layers, also flex with temperature changes. The neighboring dice in the light path bend in opposite directions. The alternate mounting compensates for the intrinsic stresses which cause the filter dies to be bent, as well as bending caused by temperature variations. FIG. 2F illustrates this point with a representational drawing which positions the dice 15 and 16 on the edge surface 61 and 62 respectively of the center land 21 (not shown in this drawing) of the core frame 20 (not shown in this drawing) without the forward slant of the edge surfaces 61 and 62. The flexing of the filter dice 15 and 16 with a change in temperature is illustrated in a exaggerated fashion. In this example, the dice 15 are arbitrarily shown as flexing outwardly (convex) and the dice 16 flexing inwardly (concave) by dotted lines. Thus the alternating convex and concave surfaces of the filter die cancel out the divergence degradation of the collimated light in the path between the filter dice. Insertion loss in the device is reduced.

Figure 4A:
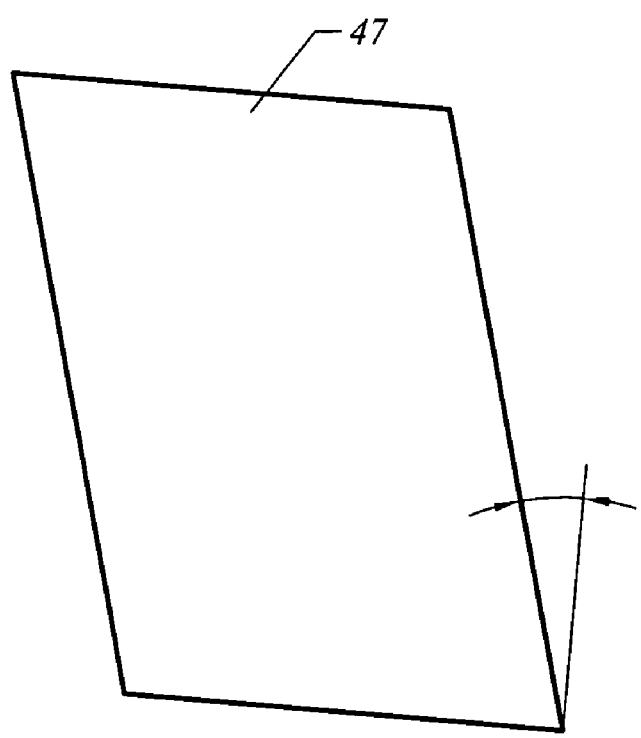
FIG. 4A is a top view of a top sealing plate for the FIG. 2A core frame.
Figure 4B:
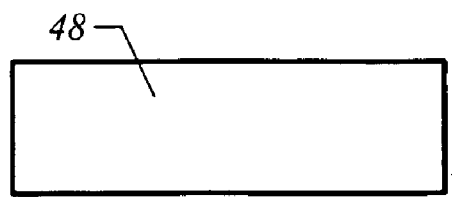
FIG. 4B is a top view of an end sealing plate for the FIG. 2A core frame.

Moisture can also adversely affect the operation of the WDM add/drop multiplexer. Besides the outer seal of the package assembly 11, described below, the core assembly 10 is also sealed. A glass plate 47 shown in FIG. 4A is fixed by epoxy over the top of the core frame 20. Metal side plates 48 shown in FIG. 4B are also epoxied to the top and bottom surfaces of the core frame 20 to cover the channels 28 and 29. The tight fittings of the apertures 30–32 and the end sections 22–24 and the epoxy in these elements completely the seal of the core assembly 10.

Package Assembly Details

Figure 5A:
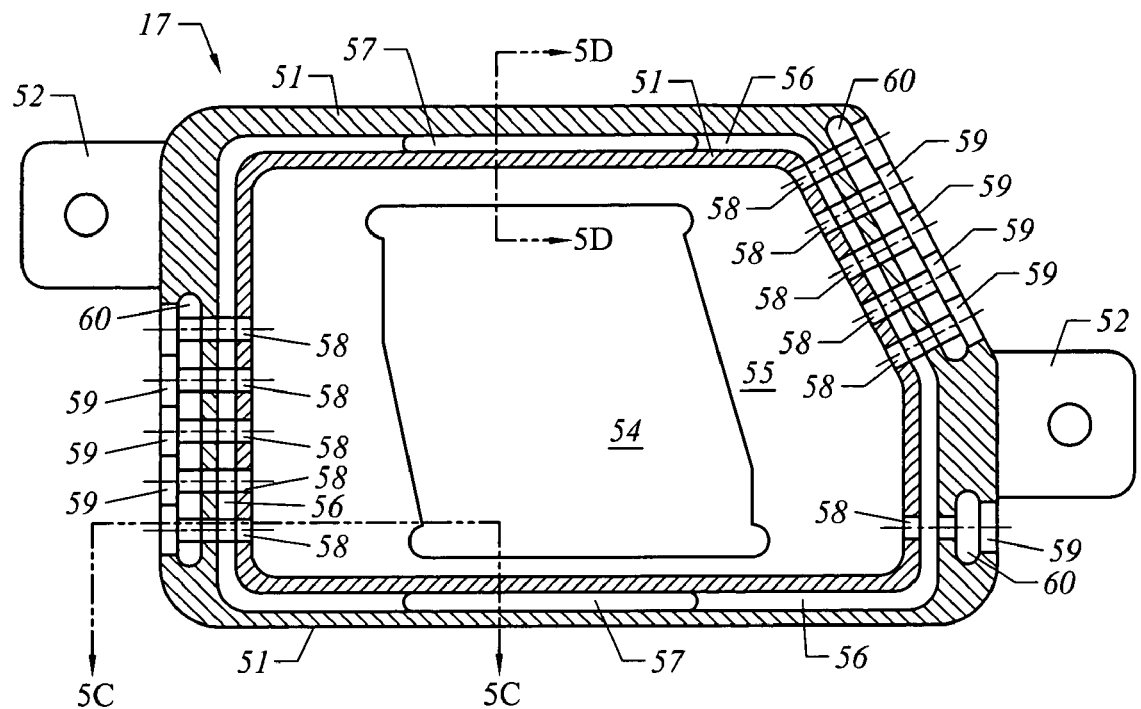
FIG. 5A is a detailed top view of the package housing base of the FIG. 1 WDM add/drop multiplexer.
Figure 5B:
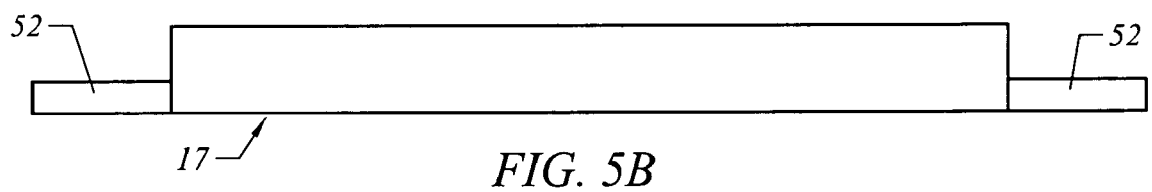
FIG. 5B is an side view of the FIG. 5A package housing base.
Figure 5C:
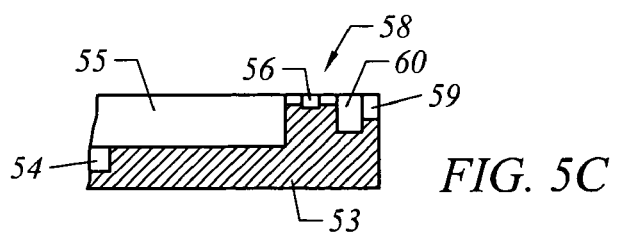
FIG. 5C is a detailed cross-sectional view of a portion of the rim of the FIG. 5A package housing base.
Figure 5D:
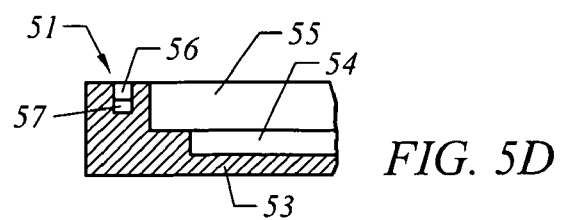
FIG. 5D is a detailed cross-sectional view of another portion of the FIG. 5A package housing base.
Figure 5E:
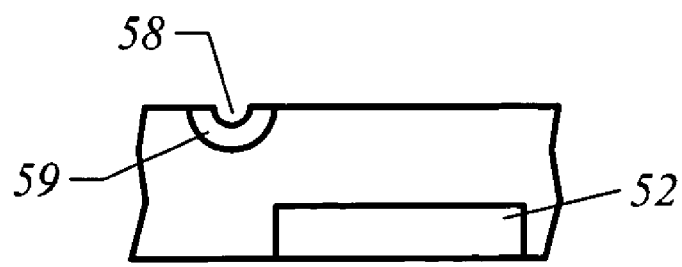
FIG. 5E is an end view of a portion of the FIG. 5A package housing base.
Figure 5F:
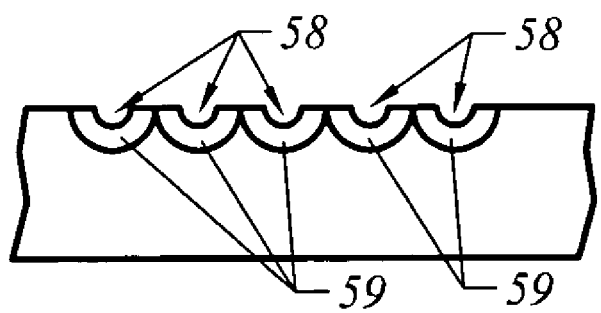
FIG. 5F is an end view of another portion near the FIG. 5E portion of the package housing base.
Figure 5G:
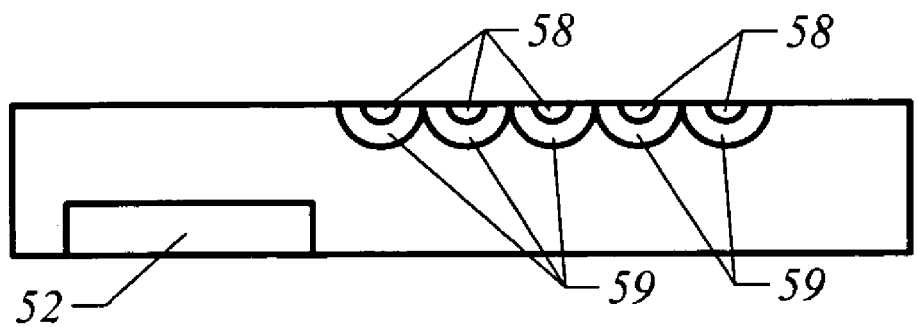
FIG. 5G is view of the other end of the FIG. 5A package housing base.

The core assembly 10 is mounted within the package assembly 11 which has a package housing base 17, shown in FIG. 5A. Mounting tabs 52 extend from the housing package base 17 also shown in the side view of FIG. 5B. The package housing base 17 has a core frame cavity 54 to hold the core assembly 10 in a base cavity 55. A rim periphery 51 has a trench 56 with a deeper center trench 57. The trenches 56 and 57 receive a corresponding male ridge elements in a package housing top for aligning the package housing base and top and for sealing the two elements together. FIG. 5C is a cross sectional view of the rim periphery 17 with inner fiber conduits 58 for the optical fibers 12–14 and larger boot conduits 59 for the protective flexible boots 65 (see FIG. 1) which enclose the optical fibers 12–14 as they leave the package assembly 11. Grooves 60 hold the boots 65 in place in the completed package assembly. FIG. 5D shows the cross section of another part of the package housing base 17 from the rim periphery 51 to the core frame cavity 54. FIGS. 5E, 5F and 5G show different side views of the package housing base 17 with the conduits 58 and 59 for the fibers and their boots respectively.

Figure 6A:
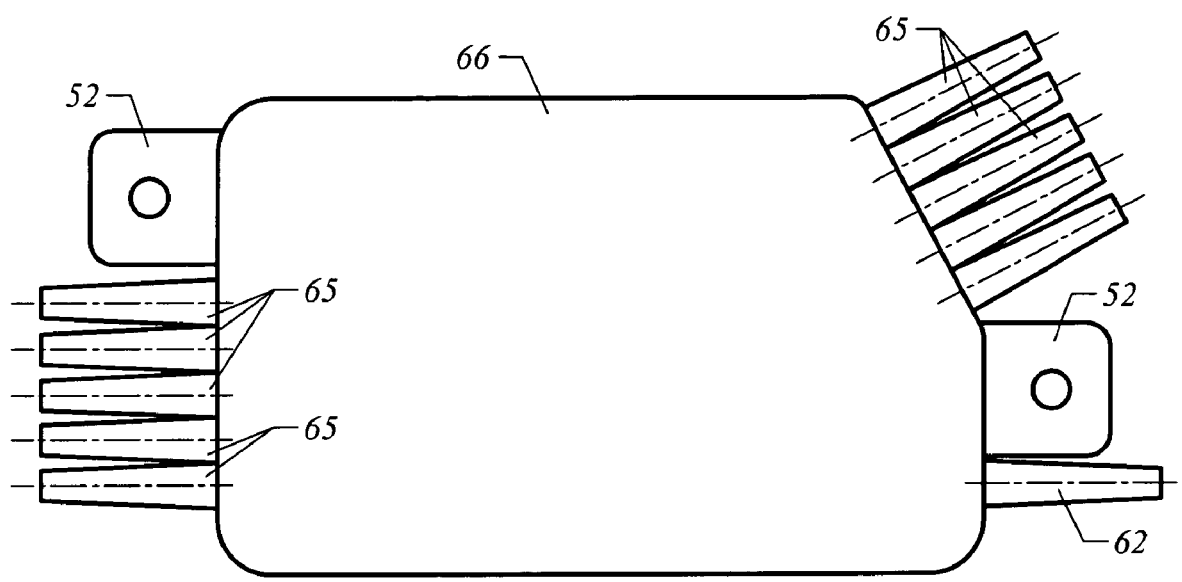
FIG. 6A is a top view of the assembled package for the WDM add/drop multiplexer of FIG. 1.
Figure 6B:
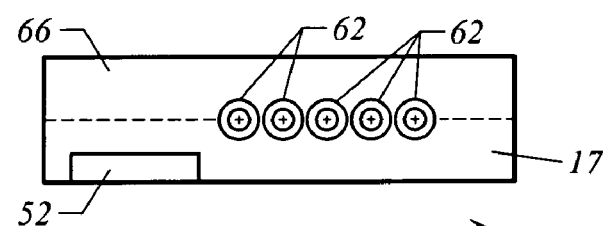
FIG. 6B is an end view of the FIG. 6A assembled package.

FIG. 6A is a top view of the aluminum package housing top 66 which mates with the package housing base 17 to hold the flexible boots 65 for the optical fibers 12–14. The side view of FIG. 6B illustrates the package assembly 11 with base 17 and top 66. To further reduce the moisture-caused degradation of the module and enhance its mechanical integrity, the package housing assembly 11 with recessed trenches in the housing walls. When the package housing is sealed by the epoxy in the trenches, the elongated length of epoxy helps to keep out the moisture. Together with the sealed inner core assembly 10, the two stage epoxy seal provides a quasi-hermetic seal to ensure long-term reliable operation of the module. A further advantage is that the space between core assembly 10 and package assembly 11 provides stress relief for the optical fibers 12–14.

The resulting package assembly 11 is very small, approximately 4.9 cm long (excluding tabs) by 3.2 cm wide by 0.9 cm thick. Such a miniaturized component facilitates easy installation of the component into a fiberoptic network. A more subtle advantage is reliability; a smaller component is easier to seal against moisture and its lighter parts are typically subjected to less force, e.g., when the component is dropped.

Figure 7:
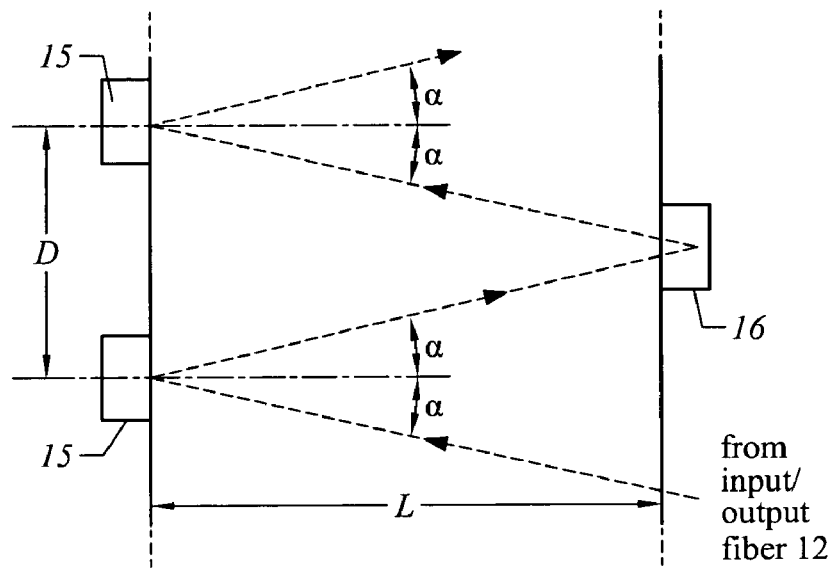
FIG. 7 is a representational drawing which illustrates the geometrical relationship between longitudinal and lateral separations of wavelength-dependent filters, and the angle of incidence, in the core assembly of the WDM add/drop multiplexer of FIG. 1.

Some considerations in miniaturizing the WDM add/drop multiplexer are based upon the geometry of core assembly 10. FIG. 7 illustrates the relationship between lateral spacing D between pairs of neighboring filter dice 15 and 16, the longitudinal spacing L between the two sets of dice 15 and 16 (or, stated differently, the width of the central land 21, see FIG. 2A), and the angle of incidence α of the light upon each of the dice 15 and 16. As for FIG. 2F, the forward slant of the core frame 20 is not drawn. The relationship is given by the following equation:

$$D = 2L * \tan \alpha$$

The angle of incidence α is based mainly upon the lateral spacing D which in turn is determined by the distance between the center axes of adjacent fiber end sections 23 and 24. With D given, the longitudinal spacing L in the core frame 20 (and thus the overall length of the core assembly 10) and the angle of incidence α are inversely related in a general sense. The larger the angle of incidence α, the smaller the distance L (and the overall package length) and the working distances of the collimating C-lenses 42 are reduced with a concomitant reduction in the amounts of insertion loss. However, larger angles of incidence make the thin-film filters 15 and 16 more susceptible to undesirable polarization-dependent effects. Larger variations in the central wavelength occur as α is changed at particular angles, which is unavoidable during the device assembly process. Therefore, a compromise between a small package size and angle of incidence α should be made.

Of course, another way to minimize package size is to reduce the lateral spacing between two adjacent fiber end sections 23 and 24. In the WDM add/drop multiplexer described above, this is done by using 1.0 mm C-lenses or (or GRIN lenses), rather than larger lenses of 1.8 mm.

To further reduce the size overall package, the packing assembly 11 is arranged so that the input/output fiber 12 and the first set of optical fibers 13 are aligned with the length of the package. The core frame 20 is slanted to the left, as shown in FIGS. 1 and 2A, by β=2α. For the described embodiment, α=13.4° and β=26.8°. This permits the width of the package assembly 11 to be correspondingly narrowed. Another advantage is that the single input/output fiber 12 does not extend away from the package assembly 11 at an oblique angle and avoids breakage.

Another WDM Add/Drop Multiplexer

Figure 8:
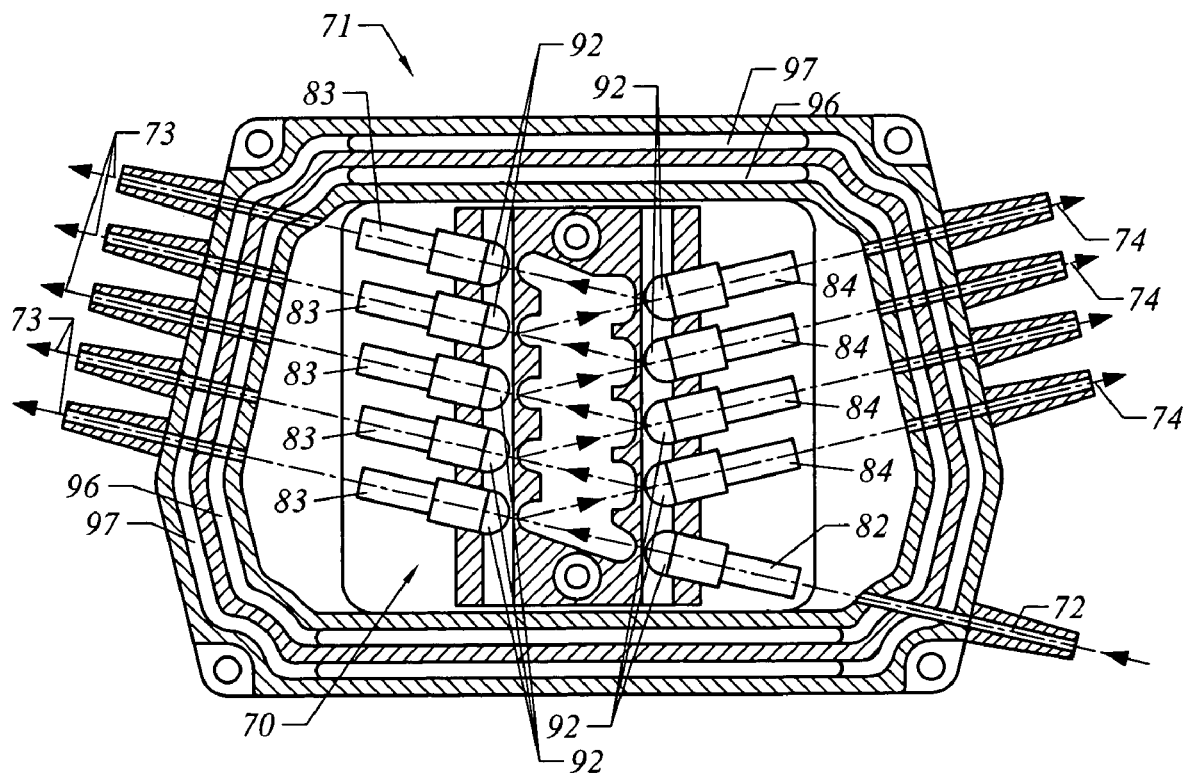
FIG. 8 is a cross-sectional top view of a 1-9 WDM add/drop multiplexer, according to another embodiment of the present invention.

Some of the advantages of this WDM add/drop multiplexer can be seen in comparison with a second WDM add/drop multiplexer, according to another embodiment of the present invention. The second WDM add/drop multiplexer, shown in a cross-sectional top view in FIG. 8, has only some of the features and advantages of the first described device. The collimating C-lens 92 (1.8 mm) and the lateral spacing D between fiber end sections 83 and 84 are larger than previously described. Hence the core assembly 70 is larger and the resulting package is larger. Furthermore, assembly requires that the C-lens 92 be fixed and aligned separately from the rest of its corresponding fiber end section 82–84. Hence assembly costs rise accordingly.

Secondly, unlike the previous assembly, the input/output fiber 72 and the first set of optical fibers 73 are not aligned with the top and bottom edges of the package assembly 71, i.e., the core frame 70 is not tilted so that the resulting device occupies more space than the previous device. This WDM add/drop multiplexer is approximately 8 cm long by 5.6 cm wide by 1 cm thick. Thirdly, it should be noted that the core assembly 90 is not sealed and only the package assembly 71 is sealed, albeit with two sealing trenches 96 and 97 to create a double seal.

Hence, the present invention provides for miniaturized, high-performance WDM add/drop multiplexers which can operate under a wide range of ambient conditions. It should readily evident that the described embodiments of the present invention are also applicable to WDM multiplexers and demultiplexers.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. A WDM multiplexer/demultiplexer comprising:
   an input/output optical fiber having an end section;
   a first set of optical fibers having end sections;
   a second set of optical fibers having end sections;
   a plurality of wavelength-dependent filters, each wavelength-dependent filter associated and in fixed relationship with an end section of first and second set optical fibers so that light transmitted through said wavelength-dependent filter passes into said associated end section; and
   a core frame holding said end sections of said input/output optical fiber, said end sections of said first and second set optical fibers, and said plurality of wavelength-dependent filters so that light from said input/output optical fiber and reflected by said plurality of wavelength-dependent filters travels in a light path from said input/output optical fiber to each wavelength-dependent filter of each end section of said first and second set optical fibers alternately.

2. The WDM multiplexer/demultiplexer of claim 1 wherein said core frame has a central space, said end sections of said first set optical fibers aligned in parallel with each other, said end sections of said second set optical fibers aligned in parallel with each other, said end sections of said first set optical fibers and wavelength-dependent filters associated therewith facing said end sections of said second set optical fibers and wavelength-dependent filters associated therewith at an angle across said central space on opposite sides of said core frame so that light from said input/output optical fiber and reflected by said plurality of wavelength-dependent filters travels in a light path from said input/output optical fiber to each wavelength-dependent filter of each end section of said first and second set optical fibers alternately through said central space.

3. The WDM multiplexer/demultiplexer of claim 2 wherein said end sections of said input/output optical fiber and of said first set and second set optical fibers, and said plurality of wavelength-dependent filters are aligned in a plane.

4. The WDM multiplexer/demultiplexer of claim 3 wherein said plurality of wavelength-dependent filters are mounted on said core frame in first and second linear arrays, said first array associated with said first set optical fibers, and said second array associated with said second set of optical fibers, said first linear array parallel to said second linear array.

5. The WDM multiplexer/demultiplexer of claim 1 further comprising a package assembly enclosing said end sections of said input/output optical fiber, and said first and second set optical fibers, said plurality of wavelength-dependent fitters, and said core frame in a seal.

6. The WDM multiplexer/demultiplexer of claim 5 wherein said package assembly has a length and said end sections of said input/output optical fiber and of said first set optical fibers are parallel with said package assembly length.

7. The WDM multiplexer/demultiplexer of claim 5 wherein said package assembly comprises a package assembly base and a package top, said package assembly base and top when joined defining a cavity for holding said end sections of said input/output optical fiber, and said first and second set optical fibers, said plurality of wavelength-dependent fitters and said core frame, and a moisture seal around a periphery of said package assembly base and top package around said cavity.

8. The WDM multiplexer/demultiplexer of claim 5 further comprising:
   a core assembly including said core frame, said end sections of said input/output optical fiber and said first and second set optical fibers, and said plurality of wavelength-dependent filters, said core assembly providing another moisture seal for said end sections of said input/output optical fiber and said first and second set optical fibers, and said plurality of wavelength-dependent filters.

9. The WDM multiplexer/demultiplexer of claim 1 wherein said plurality of wavelength dependent filters each comprise a die mounted to said core frame so as to allow said die to flex with changes of temperature.

10. The WDM multiplexer/demultiplexer of claim 9 wherein said die has corners and said die mounted to said core frame at said corners.

11. The WDM multiplexer/demultiplexer of claim 10 wherein said die comprises a first side and a second side different from said first side, and wavelength-dependent filter dice fixed to said core frame by said first side and said second side alternately in said light path to minimize divergence degradation.

12. The WDM multiplexer/demultiplexer of claim 11 wherein said plurality of wavelength-dependent filters are mounted on said core frame in first and second linear arrays, said first array associated with said first set optical fibers, and said second array associated with said second set of optical fibers, said first linear array parallel to said second linear array, and said first array die mounted to said core frame by said first side and said second array mounted to said core frame by said second side.

13. The WDM multiplexer/demultiplexer of claim 11 wherein said die comprises a substrate side and a dielectric-coated side.

14. The WDM multiplexer/demultiplexer of claim 1 wherein said core frame comprises a unitary piece of metal having a base with two parallel channels defining two edge lands, and a central land therebetween with said central space therein.

15. The WDM multiplexer/demultiplexer of claim 14 wherein said core frame comprises 440C stainless steel.

16. The WDM multiplexer/demultiplexer of claim 1 wherein each wavelength-dependent filter is selected to transmit different wavelength of light into said associated optical fiber.

17. A WDM multiplexer/demultiplexer comprising:
an input/output optical fiber having an end section;
a plurality of optical fibers having end sections;
a plurality of wavelength-dependent filters, each wavelength-dependent filter associated and in fixed relationship with an end section of said optical fibers so that light transmitted through said wavelength-dependent filter passes into said associated end section and said optical fiber; and
a core frame holding said end sections of said input/output optical fiber and said optical fibers, and said plurality of wavelength-dependent filters so that light from said input/output optical fiber reflected by said plurality of wavelength-dependent filters travels in a light path from said input/output optical fiber to each wavelength-dependent filter of each end section of each optical fiber.

18. The WDM multiplexer/demultiplexer of claim 17 wherein each of said wavelength-dependent filters has a first side and a second side, wavelength-dependent filters mounted to said core frame by said first side and said second side alternately in said light path to minimize divergence degradation.

19. The WDM multiplexer/demultiplexer of claim 18 wherein said plurality of wavelength dependent filters each comprise a die mounted to said core frame so as to allow said die to flex.

20. The WDM multiplexer/demultiplexer of claim 19 wherein said die has corners and said die mounted to said core frame at said corners.

21. The WDM multiplexer/demultiplexer of claim 20 wherein said die comprises a substrate side and a dielectric-coated side.

22. A WDM multiplexer/demultiplexer comprising:
a first optical fiber having an end section;
a plurality of second optical fibers having end sections;
a plurality of wavelength-dependent filters, each wavelength-dependent filter associated and in fixed relationship with an end section of said second optical fibers so that light transmitted through said wavelength-dependent filter passes into said associated end section and said second optical fiber;
a core assembly including a core frame holding said end sections of said first optical fiber and said second optical fibers, and said plurality of wavelength-dependent filters so that light from said first optical fiber reflected by said plurality of wavelength-dependent filters travels in a light path from said first optical fiber to each wavelength-dependent filter of each end section of each second optical fiber, said core assembly providing a first moisture seal for said end sections of said first optical fiber and second optical fibers, and said plurality of wavelength-dependent filters; and
a package assembly holding a core assembly therewithin with egress for said first and second optical fibers therefrom, said package assembly providing a second moisture seal for said core assembly.

23. The WDM multiplexer/demultiplexer of claim 22 wherein core frame comprises a unitary piece of metal having a plurality of lands for mounting said end sections of said first and second optical fibers and said wavelength-dependent filters thereon;
and wherein said core assembly further including comprises a plurality of plates attached to a top and sides of said core frame for sealing said end sections of said first and second optical fibers and said wavelength-dependent filters within said core frame.

24. The WDM multiplexer/demultiplexer of claim 23 wherein said package assembly comprises a base and a complementary top having a cavity therein for receiving said core assembly.

25. The WDM multiplexer/demultiplexer of claim 24 wherein said base and complementary top have a rim around said cavity, said rim having conduits for said first and second optical fibers.

26. A method of manufacturing a WDM multiplexer/demultiplexer having an input/output optical fiber and plurality of optical fibers, said method comprising
mounting a plurality of wavelength-dependent filters to a core frame, each of said wavelength-dependent filters having a first side and a second side, said wavelength-dependent filters mounted to said core frame by said first side and said second side alternately in said light path to minimize divergence degradation; and
mounting end sections of said input/output optical fiber and said optical fibers to said core frame, each end section of said optical fibers in fixed relationship with one of said wavelength-dependent filters so that light transmitted through said wavelength-dependent filter passes into said associated end section and said optical fiber and light from said input/output optical fiber reflected by said plurality of wavelength-dependent filters travels in a light path from said input/output optical fiber to each wavelength-dependent filter of each end section of each optical fiber.

27. The method of claim 26 wherein said plurality of wavelength dependent filters each comprise a die having corners, and said wavelength-dependent filter mounting step comprises attaching each die by its corners to said core frame so as to allow said die to flex.

28. The method of claim 27 wherein said wavelength-dependent filter mounting step comprises applying epoxy between the corners of each die and said core frame and curing said epoxy by UV light.

29. The method of claim 28 wherein said wavelength-dependent filter mounting step further comprises thermally curing said epoxy.

30. The method of claim 26 wherein said end sections mounting step comprises:
fixing an end section of said input/output fiber with respect to said mounted wavelength-dependent filters;
then sequentially adjusting each end section of said optical fibers until a maximum signal is received by the corresponding optical fiber from said input optical fiber 12, and fixing said end section by epoxy to said core frame.

31. The method of claim 26 further comprising:
defining said core frame as a unitary piece of metal.

32. The method of claim 26 further comprising:
sealing said end sections, wavelength-dependent filters in said core frame;
providing a package assembly for said sealed core, said package assembly providing egress for said input optical fiber and said optical fibers; and
sealing said sealed core frame within said package assembly to provide a two-stage seal for long-term reliable operation of said WDM multiplexer/demultiplexer.

* * * * *